United States Patent [19]

Mizuno et al.

[11] Patent Number: 4,464,558
[45] Date of Patent: Aug. 7, 1984

[54] HOT WIRE WELDING SYSTEM

[75] Inventors: Takaji Mizuno; Takao Shimizu, both of Aichi, Japan

[73] Assignee: Mitsubishi Denki Kabushiki Kaisha, Tokyo, Japan

[21] Appl. No.: 391,766

[22] Filed: Jun. 24, 1982

[30] Foreign Application Priority Data

Jun. 25, 1981 [JP] Japan .................................. 56-98752

[51] Int. Cl.$^3$ .............................................. B23K 9/10
[52] U.S. Cl. .......................... 219/130.21; 219/137 PS
[58] Field of Search .................... 219/137 PS, 130.33, 219/130.32, 130.31, 130.21

[56] References Cited

U.S. PATENT DOCUMENTS

| 3,122,629 | 2/1964 | Manz ................................... 219/74 |
| 3,483,354 | 12/1969 | Manz et al. ................... 219/137 PS |
| 3,549,857 | 12/1970 | Needham et al. ............. 219/137 PS |
| 3,627,974 | 12/1971 | Normando .................... 219/137 PS |
| 4,396,823 | 8/1983 | Nihei et al. ................... 219/137 PS |

OTHER PUBLICATIONS

"High Deposition Gas Tungsten-Arc Welding" by J. F. Saenger and A. F. Manz, dated May 1968, pp. 386–393.
"Gas Tungsten-Arc Hot Wire Welding—A Versatile New Production Tool" by J. F. Saenger, paper presented at the AWS 50th Annual Meeting held in Philadelphia, Pa. during Apr. 24–28, 1968.
"Plasma-Arc Hot-Wire Surfacing—A New High Deposition Process" by E. C. Garrabrant and R. S. Zuchowski, Welding Journal, paper presented at the AWS National Fall Meeting held in Cincinnati, Ohio, during Oct. 7–10, 1968.

Primary Examiner—C. C. Shaw
Attorney, Agent, or Firm—Sughrue, Mion, Zinn, Macpeak, and Seas

[57] ABSTRACT

A hot wire welding system including a non-melting metal electrode, a supply of filler metal to be fed to a weld puddle formed by an arc, a D.C. power source for supplying both an arc current and a filler metal heating current, a first control circuit for controlling the filler metal heating current with a constant voltage characteristic, and a second control circuit for controlling the arc current with a constant current characteristic. By eliminating one of the two power supplies which was required in prior art systems, a significant reduction in size and complexity is obtained.

8 Claims, 4 Drawing Figures

HOT WIRE WELDING SYSTEM

BACKGROUND OF THE INVENTION

The present invention relates to a hot wire welding system which can be made very small in size.

A non-melting metal electrode and a heated filler metal are used in a hot wire welding system. Gas-shielded hot tungsten arc hot wire welding and plasma arc hot wire welding are typical examples of hot wire welding systems. A gas-shielded tungsten arc forms a weld puddle on a workpiece. A filler metal is continuously melted into this puddle behind the arc to form a weld bead. An alternating current is applied through the filler metal with the magnitude of the current adjusted so as to heat the filler metal to its melting point just as it reaches the weld. The filler metal will then form a melt line just above the surface of the puddle.

Referring to FIG. 1, a typical conventional gas-shielded tungsten arc hot wire welding system is illustrated.

In FIG. 1, reference numeral 1 designates a tungsten electrode and 3 a workpiece. A gas-shielded tungsten arc 4 is formed between the tungsten electrode 1 and a workpiece 3 by current supplied from a D.C. power source 2. A D.C. power source 6 for heating a filler metal 5 supplies the filler metal 5 with a current which flows through a contact member 7, the filler metal 5, a weld puddle 8 and the workpiece 3. The heat for maintaining the weld puddle 8 is provided by the gas-shielded tungsten arc 4. The filler metal 5 contacts the puddle 8, melts, and is deposited solely by the action of resistance heating. In this manner, welding metal 9 is formed on the workpiece 3.

Reference numeral 10 designates a nozzle for supplying the arc 4 with gas. The filler metal 5 is wound in a coil on a wire reel 11. A wire feeder 12 feeds the filler wire 5 from the wire reel 11 to the puddle 8 through the contact member 7. The D.C. power source 2 is a constant current type source, while the D.C. power source 6 is a constant voltage type source.

In this conventional gas-shielded tungsten arc hot wire welding system, two D.C. power sources 2 and 6 are required. Consequently, this system requires two transformers and two control circuits for the power sources. Hence the cost of the system is unfavorably high. Also, this system inevitably has a large physical size, and hence requires a considerably large space for installation.

SUMMARY OF THE INVENTION

It is an object of the present invention to overcome the aforementioned disadvantages and to provide a hot wire welding system which is simple in construction.

Another object of the invention is to provide such a system which produces high quality welds with a high productivity.

The foregoing and other objects of the present invention have been attained by providing a hot wire welding system comprising a non-melting metal electrode, a source of a filler metal to be fed to a weld puddle formed by an arc, a D.C. power source for supplying both an arc current and a filler metal heating current, a first control circuit for controlling the filler metal heating current so as to have a constant voltage characteristic, and a second control circuit for controlling the arc current so as to have a constant current characteristic.

DESCRIPTION OF THE PREFERRED EMBODIMENTS

In accordance with the present invention, a single D.C. power source 13 is provided to supply current to both a non-melting metal electrode 1 and a filler metal 5, to thus provide a compact hot wire welding system of reduced cost.

Figure 1:
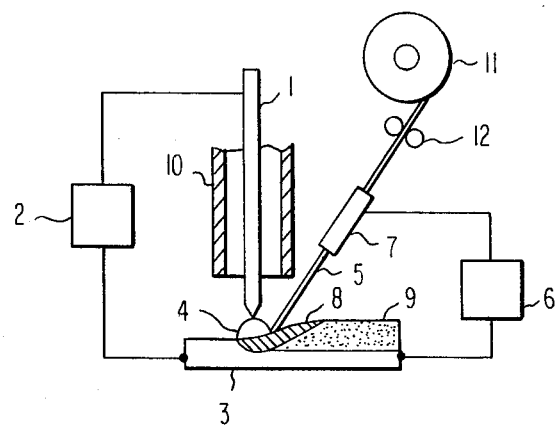
FIG. 1 is a circuit block diagram of a conventional hot wire welding system.
Figure 2:
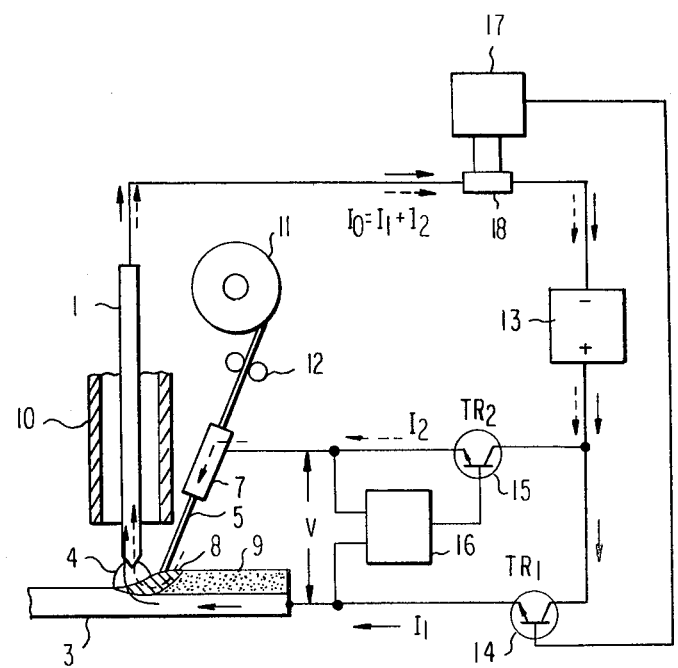
FIG. 2 is a circuit block diagram of a hot wire welding system of the present invention.

Referring to FIG. 2, a hot wire welding system of the present invention is shown in block diagram form. FIG. 2 is a detailed circuit diagram of this system. Reference numerals 1, 3-5, 7-12 denote identical or similar parts to those correspondingly numbered in FIG. 1, and hence further description of the construction and operation thereof are omitted.

In FIG. 2, reference numeral 13 designates a D.C. power source for supplying both an arc current and a filler metal heating current. Reference numeral 14 designates a switching circuit (a transistor $TR_1$) which controls the arc current and 15 designates a switching circuit (a transistor $TR_2$) which controls the filler metal heating current. The switching circuits 14 and 15 are controlled by control circuits 16 and 17, respectively. A current detector 18, which may be a shunt, detects the total current $I_0$ which flows from the tungsten electrode 1 to the D.C. power source 13.

The construction and operation of the switching circuits 14 and 15 and the control circuits 16 and 17 will next be discussed in more detail.

Figure 3:
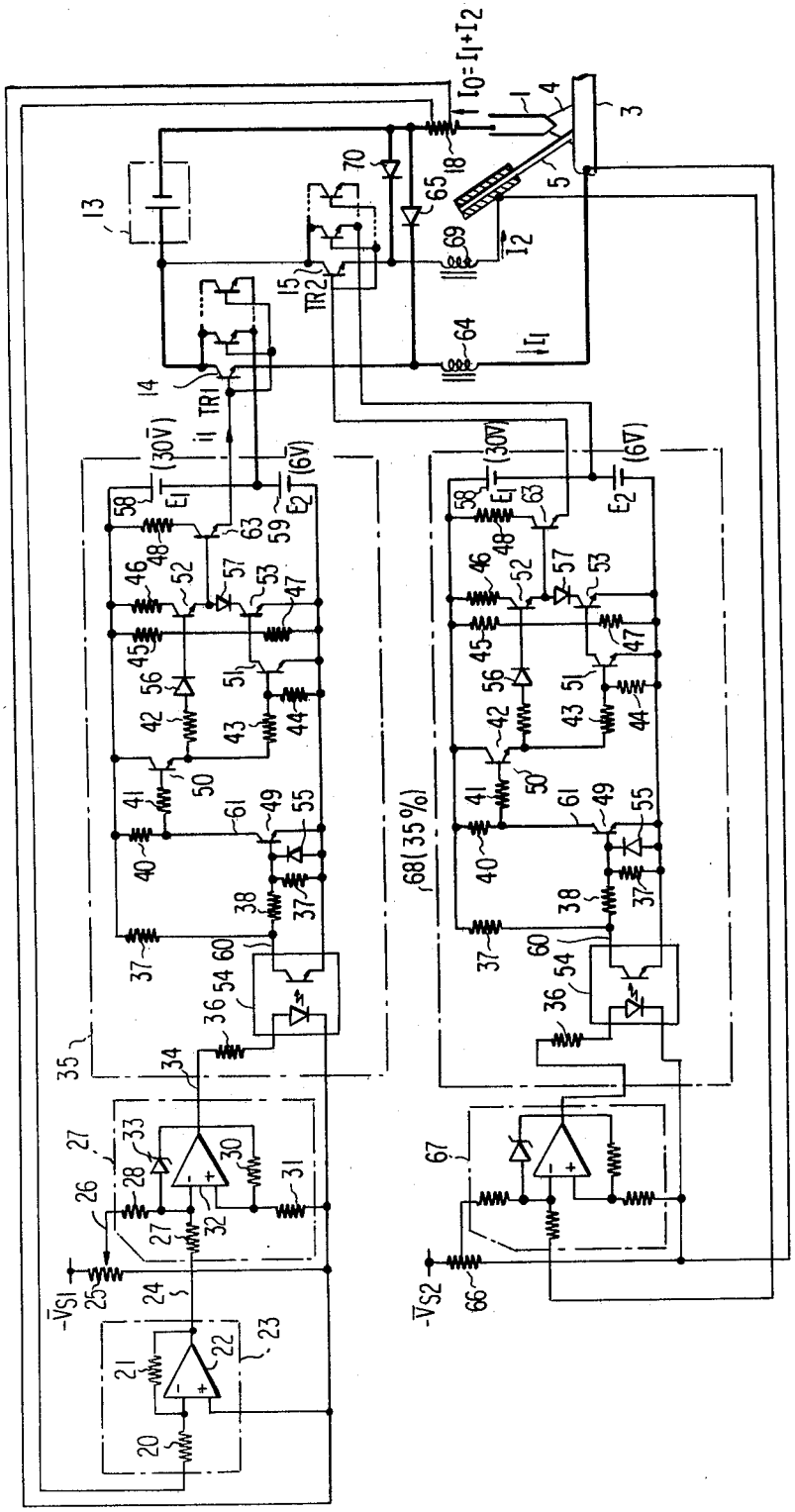
FIG. 3 is a detailed circuit diagram of a preferred embodiment of the hot wire welding system of FIG. 2.

As shown in FIG. 3, the switching circuit 14 is composed of a plurality of power transistors $TR_1$ which are connected in parallel to form a composite transistor $TR_1$. The arc current $I_1$ flows to the workpiece 3 and the tungsten electrode 1 through these transistors and is controlled thereby. The switching circuit 15 is also compressed of a plurality of power transistors $TR_2$ connected in parallel. The filler metal heating current $I_2$ flows to the contact member 7, the filler metal 5, the workpiece 3 and the tungsten electrode 1 through those transistors and is controlled thereby.

The shunt 18 converts the detected total current $I_0$ into a voltage. Within the control circuit 17, an amplifier 23 amplifies that voltage, a comparator 27 compares the output signal 23 (hereinafter, the "first feedback signal") from the amplifier 23 with a first predetermined fixed voltage 26, a switching control circuit 35 converts the output signal 34 from the comparator 27 into a control signal, and that control signal is employed to control the switching circuit 14.

The amplifier 23 includes two resistors 20 and 21 and an operational amplifier 22. The amplifier 23 amplifies a small voltage (typically 20-30 mV) from the shunt 18. A reference voltage $V_{s1}$ and a variable resistor 25 determine the value of the first fixed voltage 26.

Figure 4:
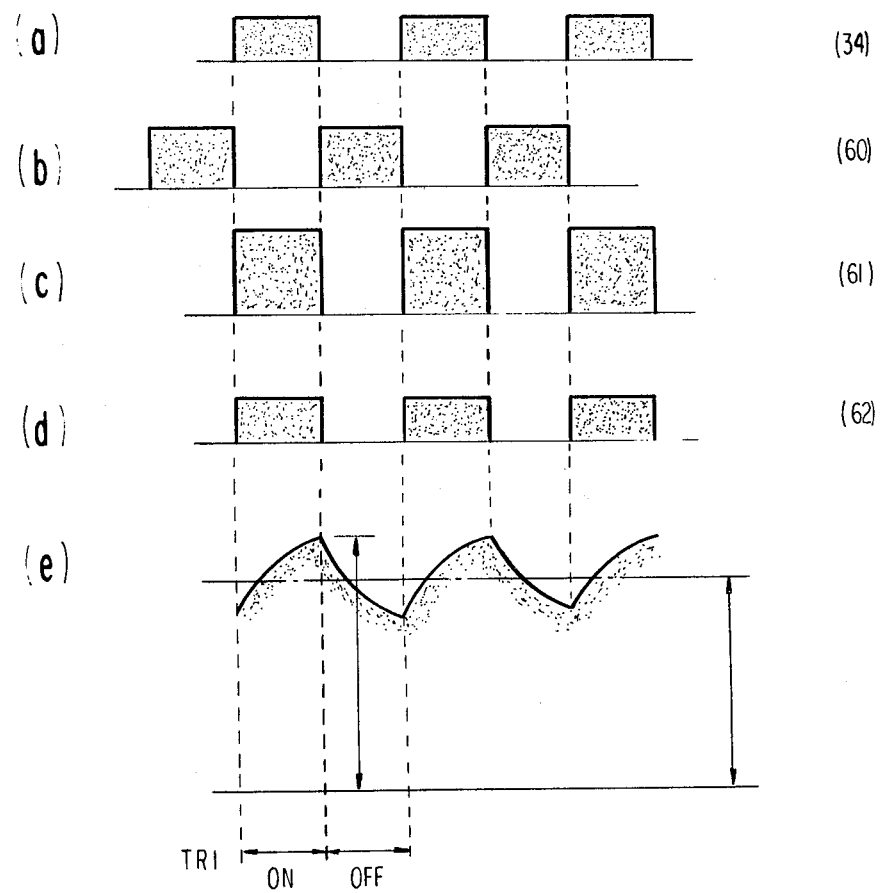
FIG. 4 is a waveform diagram used to explain the operation of the circuit of FIG. 3.

The comparator 27 is provided with four resistors 28-31, an operational amplifier 32 and a zener diode 33. The comparator 27 compares the first feedback signal 24 with the first fixed voltage 26. If the first fixed voltage 26 is greater than the first feedback signal 24, the output signal 34 from the comparator 27 has a level equal to the zener voltage $V_2$ of the zener diode 33, and if the first feedback signal 24 is greater than the first fixed voltage 26, the output signal 34 is zero. The waveform of this signal is illustrated in FIG. 4a.

The switching control circuit 35 includes thirteen resistors 36–48, six transistors 49–53 and 63, a photocoupler 54, three diodes 55–57, two D.C. power sources 58 and 59, and the transistor $TR_1$, arranged as shown in FIG. 3. The waveform of the output signal 60 from the photocoupler 54 is illustrated in FIG. 4b, the signal output 61 from the transistor 49 is illustrated in FIG. 4c, and the input signal 62 to the transistor 63 is illustrated in FIG. 4d. The total current $I_0$ flowing through the electrode 1 is the average current of the main circuit, which is held constant. The waveform of the total current $I_0$ is illustrated in FIG. 4e.

With this circuit, when the first fixed voltage 26 is greater than the first feedback signal 24, the transistor $TR_1$ is in the ON state, and when the first feedback signal 24 is greater than the first fixed voltage 26, the transistor $TR_1$ is in the OFF state.

In the control circuit 16, a comparator 67 compares a second feedback signal, specifically the supply voltage as applied to the filler metal 5, with a second fixed voltage, the value of which is determined by a reference voltage $V_{S2}$ and a variable resistor 66. A switching control circuit 68 converts the output signal from the comparator 67 into a control signal, which in turn is used to control the switching circuit 15. The comparator 67 has the same circuit arrangement as the comparator 27, and the switching control circuit 68 has the same circuit arrangement as the switching control circuit 35.

When the second fixed voltage is greater than the second feedback signal, the transistor $TR_2$ is in the ON state, and when the second feedback signal is greater than the second fixed voltage, the transistor $TR_2$ is in the OFF state.

In FIG. 3, reference numerals 64 and 69 designate reactors, and 65 and 70 designate flywheel diodes.

In the hot wire welding system of the invention having the aforementioned structure, the arc current $I_1$ flows from the D.C. power source 13 through the transistor $TR_1$, the reactor 64, the workpiece 3, the puddle 8, the arc 4, the tungsten electrode 1 and the shunt 18, as shown by a solid line with an arrow in FIG. 2. The filler metal heating current $I_2$ flows from the D.C. power source 13 through the transistor $TR_2$, the reactor 69, the contact member 7, the filler metal 5, the puddle 8, the arc 4, the tungsten electrode 1 and the shunt 18, as shown by a broken line with an arrow in FIG. 2. Thus, the total current $I_0$ is the sum of the arc current $I_1$ plus the filler metal heating current $I_2$.

It is required that the voltage supplied across the contact element 7 and the workpiece 3 for heating the filler metal 5 have a constant voltage characteristic, as described above. To accomplish this, the control circuit 16 provides a control signal to the transistor $TR_2$ which controls the transistor $TR_2$ such that the second feedback voltage is maintained at the second fixed constant voltage. Consequently, the supply voltage between the contact member 7 and the workpiece 3 will be maintained constant.

When the length of the filler metal 5 between the contact member 7 and the workpiece 3 changes, the resistance of the filler metal 5 changes accordingly, and hence the filler metal heating current $I_2$ changes. However, as mentioned above, it is required that the total current $I_0$ ($=I_1+I_2$) of the arc have a constant current characteristic. To effect this, the shunt 18 converts the detected total current $I_0$ into the first feedback signal, this first feedback signal is applied to the control circuit 17, which in response thereto produces a first control signal. The first control signal, applied to the transistor $TR_1$, controls the transistor $TR_1$ such that the arc current $I_1$ is maintained equal to the total current $I_0$ minus the filler metal heating current. Consequently, even if the filler metal heating current $I_2$ changes, the transistor $TR_1$ controls the arc current $I_1$ so as to compensate. Accordingly, the total current $I_0$ has a constant current characteristic.

In the preferred embodiment discussed above, the hot wire welding system is described as being a gas-shielded tungsten arc hot wire welding system. However, another system, such as a plasma-arc system, may be employed while retaining similar advantageous effects.

Also, in the described embodiment, reference is made to a case where the total current $I_0$ and the filler metal feeding speed are constant. Another possibility is to have the transistor $TR_1$ control the arc current $I_1$ in such a manner that the total current $I_0$ is a pulse current having pulses synchronous with interruption of the filler metal feed. Similar effects are also obtained in that case.

As described, in accordance with the system of the present invention, the transistors $TR_1$ and $TR_2$ are controlled by respective control circuits such that the filler metal heating voltage is constant and the total current $I_0$ is also constant while using only a single D.C. power source. With this arrrangement, the cost of the system is reduced, the system's physical size is minimized, and less space is required for installation than in prior art systems.

We claim:

1. A hot wire welding system comprising;
   a non-melting metal electrode;
   means for supplying filler metal to a weld puddle formed by an arc between said electrode and a workpiece;
   a single D.C. power source for supplying both an arc current forming an arc between said electrode and said workpiece and a filler metal heating current for heating said filler metal;
   means for controlling said filler metal heating current such that a supply voltage between said filler metal and said workpiece is maintained substantially constant; and
   means for controlling said arc current such that a total current equal to the sum of said arc current and said filler metal heating current flowing in said arc is substantially constant, said means for controlling said filler metal heating current comprising a first switching circuit and a first control circuit for controlling a switching state of said first switching circuit in response to said supply voltage.

2. The hot wire welding system according to claim 1, wherein said first switching circuit comprises a plurality of power transistors connected in parallel.

3. The hot wire welding system according to claim 1, wherein said first control circuit comprises a voltage detector for detecting said supply voltage between said filler metal and said workpiece, and a control circuit for comparing the detected voltage with a first predetermined fixed voltage and for generating a control signal for controlling said first switching circuit in response to said detected voltage.

4. The hot wire welding system according to claim 1, wherein said means for controlling said arc current comprises a second switching circuit and a second control circuit controlling said second switching circuit.

5. The hot wire welding system according to claim 4, wherein said second switching circuit comprises a plurality of power transistors connected in parallel.

6. The hot wire welding system according to claim 4, wherein said second control circuit comprises a current detector for detecting a total current flowing through said electrode from said D.C. power source; and control circuit means comprising means for converting said detected current into a voltage, means for comparing said converted voltage with a predetermined reference voltage, and means for producing a control signal for controlling said second switching circuit in response to an output of said comparing means.

7. The hot wire welding system according to claim 6, wherein said current detector comprises a shunt.

8. The hot wire welding system according to claim 1, wherein said non-melting metal electrode comprises a tungsten electrode.

* * * * *